US012719354B2

(12) United States Patent
Wang et al.

(10) Patent No.: US 12,719,354 B2
(45) Date of Patent: Aug. 25, 2026

(54) METHOD AND APPARATUS FOR CALIBRATING PULSE-FREQUENCY MODULATION CONVERTER BY USING EMULATED SLOPE SIGNAL

(71) Applicant: Airoha Technology Corp., Hsinchu City (TW)

(72) Inventors: Chen-Yu Wang, New Taipei City (TW); Ke-Deng Huang, New Taipei City (TW)

(73) Assignee: Airoha Technology Corp., Hsinchu City (TW)

( * ) Notice: Subject to any disclaimer, the term of this patent is extended or adjusted under 35 U.S.C. 154(b) by 150 days.

(21) Appl. No.: 18/908,727

(22) Filed: Oct. 7, 2024

(65) Prior Publication Data

US 2025/0125716 A1 Apr. 17, 2025

Related U.S. Application Data

(60) Provisional application No. 63/544,431, filed on Oct. 16, 2023.

(51) Int. Cl.

| | |
|---|---|
| ***H02M 1/32*** | (2007.01) |
| ***H02M 1/00*** | (2006.01) |
| ***H02M 1/08*** | (2006.01) |
| ***H02M 3/158*** | (2006.01) |

(52) U.S. Cl.

CPC ........... *H02M 1/32* (2013.01); *H02M 1/0025* (2021.05); *H02M 1/08* (2013.01); *H02M 3/158* (2013.01)

(58) Field of Classification Search

CPC ........ H02M 1/32; H02M 1/0025; H02M 1/08; H02M 1/0003; H02M 1/088

See application file for complete search history.

(56) References Cited

U.S. PATENT DOCUMENTS

| | | | | |
|---|---|---|---|---|
| 7,230,406 | B2 * | 6/2007 | Huang | H02M 3/158 323/284 |
| 7,688,150 | B2 * | 3/2010 | Kurd | H03L 7/101 331/186 |
| 9,148,917 | B2 * | 9/2015 | Omi | H05B 45/38 |
| 9,444,338 | B1 * | 9/2016 | Pastorina | G05F 1/10 |
| 9,553,513 | B2 * | 1/2017 | Xu | H02M 3/156 |
| 9,621,036 | B2 * | 4/2017 | Wibben | H02M 3/156 |
| 10,063,143 | B1 * | 8/2018 | Fan | H01F 41/04 |
| 10,069,397 | B2 | 9/2018 | Vaidya | |

(Continued)

FOREIGN PATENT DOCUMENTS

| | | |
|---|---|---|
| TW | 201508435 A | 3/2015 |
| TW | 202304253 A | 1/2023 |

*Primary Examiner* — Yusef A Ahmed

(74) *Attorney, Agent, or Firm* — Winston Hsu

(57) ABSTRACT

A calibration circuit of a pulse-frequency modulation (PFM) converter includes a signal generator circuit and a calibration control circuit. The signal generator circuit generates and outputs an emulated slope signal to a comparator circuit under a calibration mode, wherein the emulated slope signal has an emulated slope following an initial voltage, and the emulated slope corresponds to a slope of a sensed signal indicative of electrical characteristic of an inductor of the PFM converter. The calibration control circuit refers to an output signal that is generated from a PFM control circuit in response to an output signal of the comparator circuit, to calibrate at least one circuit of the PFM converter.

20 Claims, 14 Drawing Sheets

(56) References Cited

U.S. PATENT DOCUMENTS 10,069,412 B2 * 9/2018 Lee .................... H02M 3/156
10,581,325 B1 * 3/2020 Munroe .................. H02M 1/08
11,942,959 B2 * 3/2024 Jefremow ............. H03M 1/109
2007/0001655 A1 * 1/2007 Schiff .................. H02M 3/158 323/246
2009/0322299 A1 * 12/2009 Michishita ........... H02M 3/156 323/282
2010/0033215 A1 * 2/2010 Fogg ...................... H03K 4/50 327/137
2011/0241641 A1 * 10/2011 Chen .................. H02M 3/1588 323/284
2011/0291632 A1 * 12/2011 Yu ......................... H02M 3/158 323/283
2013/0249508 A1 * 9/2013 Rahimi ................ H02M 3/156 323/271
2014/0239924 A1 * 8/2014 Guo ......................... G05F 1/46 323/271
2014/0239925 A1 * 8/2014 Tanabe ................. H02M 3/158 323/271
2014/0268950 A1 * 9/2014 Medina-Garcia ........................... H02M 3/33523 363/78
2015/0214827 A1 * 7/2015 Yoon ...................... H02M 1/14 323/286
2015/0244262 A1 * 8/2015 Ouyang ................ H02M 3/158 323/283
2015/0349636 A1 * 12/2015 Bodano .................. H02M 1/32 323/271
2016/0036322 A1 * 2/2016 Miyamae ................ H02M 1/14 323/284
2016/0049859 A1 * 2/2016 de Cremoux ........... H02M 1/08 323/282
2016/0345395 A1 11/2016 Chen
2018/0152103 A1 * 5/2018 Mansri .................. H02M 3/156
2020/0127561 A1 * 4/2020 Takada .................. H02M 3/156
2020/0212800 A1 * 7/2020 Fan ...................... H02M 3/158
2020/0228012 A1 * 7/2020 Lynch .................. H02M 3/158
2020/0287464 A1 * 9/2020 Lu ......................... H02M 3/157
2021/0099073 A1 * 4/2021 Hrinya ................ H02M 3/1588
2022/0200456 A1 * 6/2022 Chen ..................... H02M 3/158
2023/0275513 A1 * 8/2023 Chen ..................... H02M 3/158 363/13
2024/0258915 A1 * 8/2024 Tennant ................ H02M 3/156
2025/0030341 A1 * 1/2025 Wen .................... H02M 3/1582
2025/0260319 A1 * 8/2025 Sareen ................ H02M 3/1582

* cited by examiner (A)

(B)

(A)

(B)

(C)

METHOD AND APPARATUS FOR CALIBRATING PULSE-FREQUENCY MODULATION CONVERTER BY USING EMULATED SLOPE SIGNAL

CROSS REFERENCE TO RELATED APPLICATIONS

This application claims the benefit of U.S. Provisional Application No. 63/544,431, filed on Oct. 16, 2023. The content of the application is incorporated herein by reference.

BACKGROUND OF THE INVENTION

1. Field of the Invention

The present invention relates to a voltage converter design, and more particularly, to a method and apparatus for calibrating a pulse-frequency modulation converter by using an emulated slope signal.

2. Description of the Prior Art

Switching direct current-direct current (DC-DC) voltage converters (regulators) are commonly used to provide a regulated voltage output derived from a power source such as a battery. One common type of switching voltage converter operates as a step down regulator (buck converter) that provides an output voltage which is lower than an input voltage. The pulse-frequency modulation (PFM) mode has a very simple structure in a DC-DC buck converter, and can save chip area. In addition, the PFM control can achieve high efficiency under light-load conditions. Generally speaking, the PFM control employs a pulse train to regulate an output voltage of the DC-DC buck converter. For example, a typical PFM converter has a plurality of comparator circuits to control an inductor current pulse in each PFM period. One comparator circuit monitors an output voltage of the PFM converter to control a starting time of an inductor charging state, another comparator circuit monitors a peak value of an inductor current of the PFM converter to control an ending time of an inductor charging state and a starting time of an inductor discharging state, and still another comparator circuit monitors zero-crossing of the inductor current to control an ending time of an inductor discharging state. However, due to certain factors including process variation, comparator DC offset, comparator delay time, power switch (metal-oxide-semiconductor field-effect transistor (MOSFET)) channel resistance, power supply, temperature, etc., the actual timing of stopping the inductor charging state and/or the actual timing of stopping the inductor discharging state may be deviated from expected timing. As a result, power efficiency degrades due to non-ideal state switching. Thus, there is a need for an innovative calibration scheme which can greatly improve the power efficiency of the PFM converter.

SUMMARY OF THE INVENTION

One of the objectives of the claimed invention is to provide a method and apparatus for calibrating a pulse-frequency modulation converter by using an emulated slope signal.

According to a first aspect of the present invention, an exemplary calibration circuit of a pulse-frequency modulation (PFM) converter is disclosed. The exemplary calibration circuit includes a signal generator circuit and a calibration control circuit. The signal generator circuit is arranged to generate and output an emulated slope signal to a comparator circuit under a calibration mode, wherein the emulated slope signal has an emulated slope following an initial voltage, and the emulated slope corresponds to a slope of a sensed signal indicative of electrical characteristic of an inductor of the PFM converter. The calibration control circuit is arranged to refer to an output signal that is generated from a PFM control circuit in response to an output signal of the comparator circuit, to calibrate at least one circuit of the PFM converter.

According to a second aspect of the present invention, an exemplary calibration method employed by a pulse-frequency modulation (PFM) converter is disclosed. The exemplary calibration method includes: generating and outputting an emulated slope signal to a comparator circuit under a calibration mode, wherein the emulated slope signal has an emulated slope following an initial voltage, and the emulated slope corresponds to a slope of a sensed signal indicative of electrical characteristic of an inductor of the PFM converter; and calibrating at least one circuit of a PFM converter according to an output signal that is generated from the PFM control circuit in response to an output signal of the comparator circuit.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
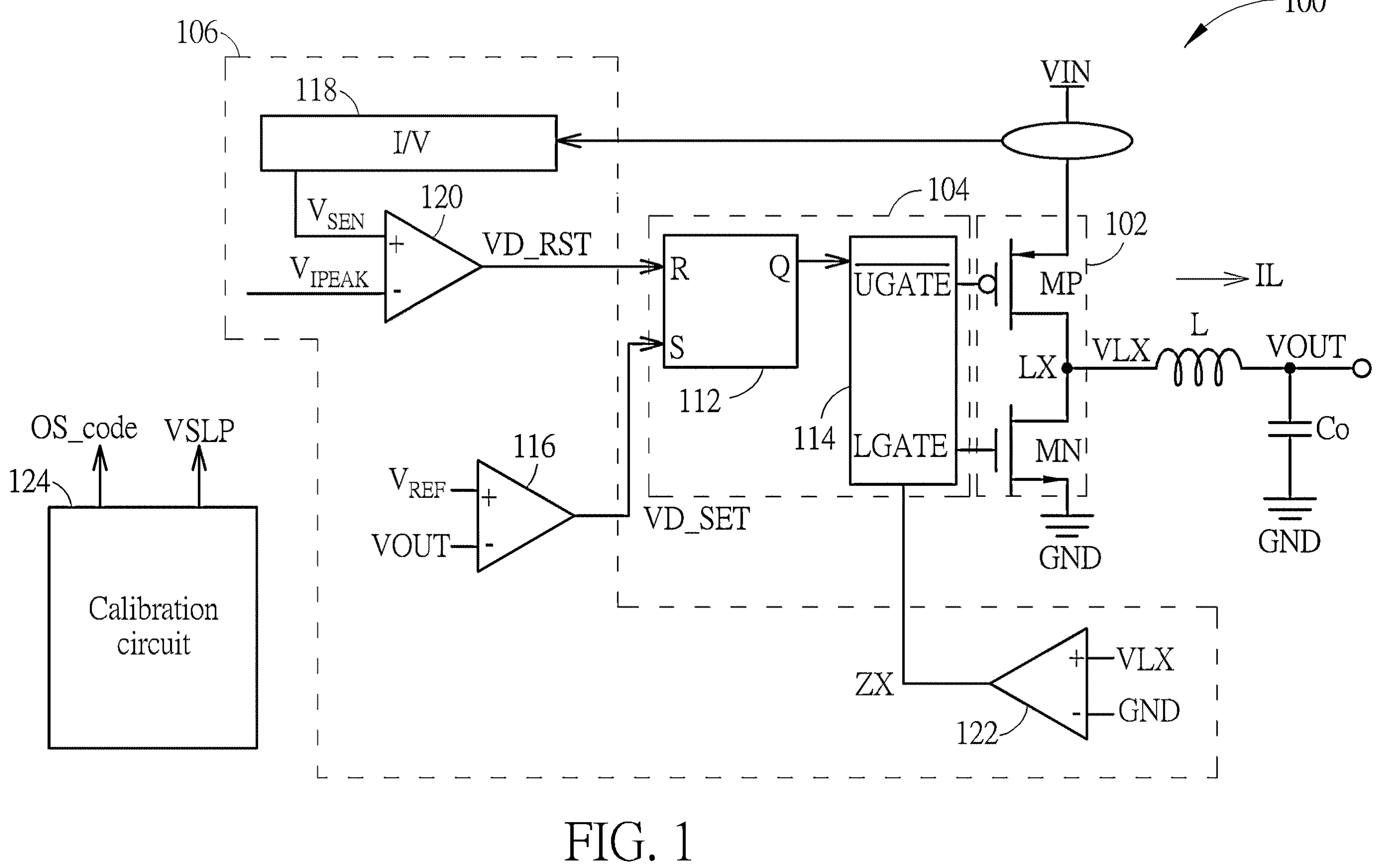
FIG. 1 is a diagram illustrating a PFM converter according to an embodiment of the present invention.

FIG. 1 is a diagram illustrating a PFM converter according to an embodiment of the present invention. The PFM converter 100 may be used as a DC-DC buck converter for regulating an output voltage VOUT according to an input voltage VIN (VOUT<VIN). For example, the input voltage VIN may be supplied from a battery. The PFM converter 100 includes a power stage (PS) circuit 102, a PFM control circuit 104, a feedback control circuit 106, an inductor L, an output capacitor Co, and a calibration circuit 124 with slope prediction. The PS circuit 102 is coupled between the input voltage VIN and a reference voltage (e.g., ground voltage GND), and includes a high-side power switch circuit and a low-side power switch circuit. In this embodiment, the high-side power switch circuit is implemented by a P-channel metal-oxide-semiconductor (PMOS) transistor MP, and the low-side power switch circuit is implemented by an N-channel metal-oxide-semiconductor (NMOS) transistor MN. The PFM control circuit 104 may include logic gates and pre-drivers, and is responsible for dealing with the PFM control. By way of example, but not limitation, the PFM control circuit 104 may include a set-reset (SR) latch circuit 112 and a switch control circuit 114. The SR latch circuit 112 has a set input node (labeled by "S"), a reset input node (labeled by "R"), and an output node (labeled by "Q"). The operation of the SR latch circuit 112 may be represented by the following truth table, but the present invention is not limited thereto.

| S | R | Q |
|---|---|---|
| 0 | 0 | Q (Latch) |
| 0 | 1 | 0 |
| 1 | 0 | 1 |
| 1 | 1 | 0 |

The switch control circuit 114 is used for setting the output signals $\overline{UGATE}$ and LGATE in response to an output signal of the SR latch circuit 112 or a feedback control signal ZX obtained from zero-crossing detection. The output signal $\overline{UGATE}$ is coupled to a gate terminal of the PMOS transistor MP, and the output signal LGATE is coupled to a gate terminal of the NMOS transistor MN. When the output node of the SR latch circuit 112 is set by a logic high level (i.e., Q=1), the switch control circuit 114 sets each of the output signals $\overline{UGATE}$ and LGATE by a logic low level (i.e., $\overline{UGATE}=\overline{Q}=0$ & LGATE=$\overline{Q}$=0), such that the high-side power switch circuit (PMOS transistor MP) is turned on, and the low-side power switch circuit (NMOS transistor MN) is turned off. When the output node of the SR latch circuit 112 is reset by a logic low level (i.e., Q=0), the switch control circuit 114 sets each of the output signals $\overline{UGATE}$ and LGATE by a logic high level (i.e., $\overline{UGATE}=\overline{Q}=1$ & LGATE=$\overline{Q}$=1), such that the high-side power switch circuit (PMOS transistor MP) is turned off, and the low-side power switch circuit (NMOS transistor MN) is turned on. Furthermore, when the feedback control signal ZX has a level transition from the logic low level (i.e., ZX=0) to the logic high level (i.e., ZX=1), the output signal LGATE is reset by the logic low level (i.e., LGATE=0), where the output signal $\overline{UGATE}$ remains at the logic high level (i.e., $\overline{UGATE}$=1). Hence, the high-side power switch circuit (PMOS transistor MP) and the low-side power switch circuit (NMOS transistor MN) are both turned off.

The feedback control circuit 106 is arranged to generate a plurality of feedback control signals that are required by the PFM control circuit 104. In this embodiment, the feedback control circuit 106 includes a plurality of comparator circuits 116, 120, 122 and a current-to-voltage converter circuit (labeled by "I/V") 118. A sensed current signal that provides information on the inductor current IL ($I_{SEN}\cong IL$) flowing through the inductor L is converted into a sensed voltage signal $V_{SEN}$ by the current-to-voltage converter circuit 118. That is, the sensed voltage signal $V_{SEN}$ is indicative of the current value of the inductor current IL.

The comparator circuit 120 is arranged to compare the sensed voltage signal $V_{SEN}$ with a target peak current value $V_{IPEAK}$ (which is a voltage level indicative of a peak limit of the inductor current IL), and generate and output a feedback control signal VD_RST to the reset input node (labeled by "R") of the SR latch circuit 112.

The comparator circuit 116 is arranged to compare the output voltage VOUT of the PFM converter 100 with a reference voltage $V_{REF}$, and generate and output a feedback control signal VD_SET to the set input node (labeled by "S") of the SR latch circuit 112.

The comparator circuit 122 is arranged to compare a voltage VLX at one terminal LX of the inductor L (which is also a connection node between the high-side power switch circuit (PMOS transistor MP) and the low-side power switch circuit (NMOS transistor MN) of the power stage circuit 102) with a reference voltage (e.g., ground voltage GND) for zero-crossing detection, and generate and output the feedback control signal ZX to the switch control circuit 114.

Figure 2:
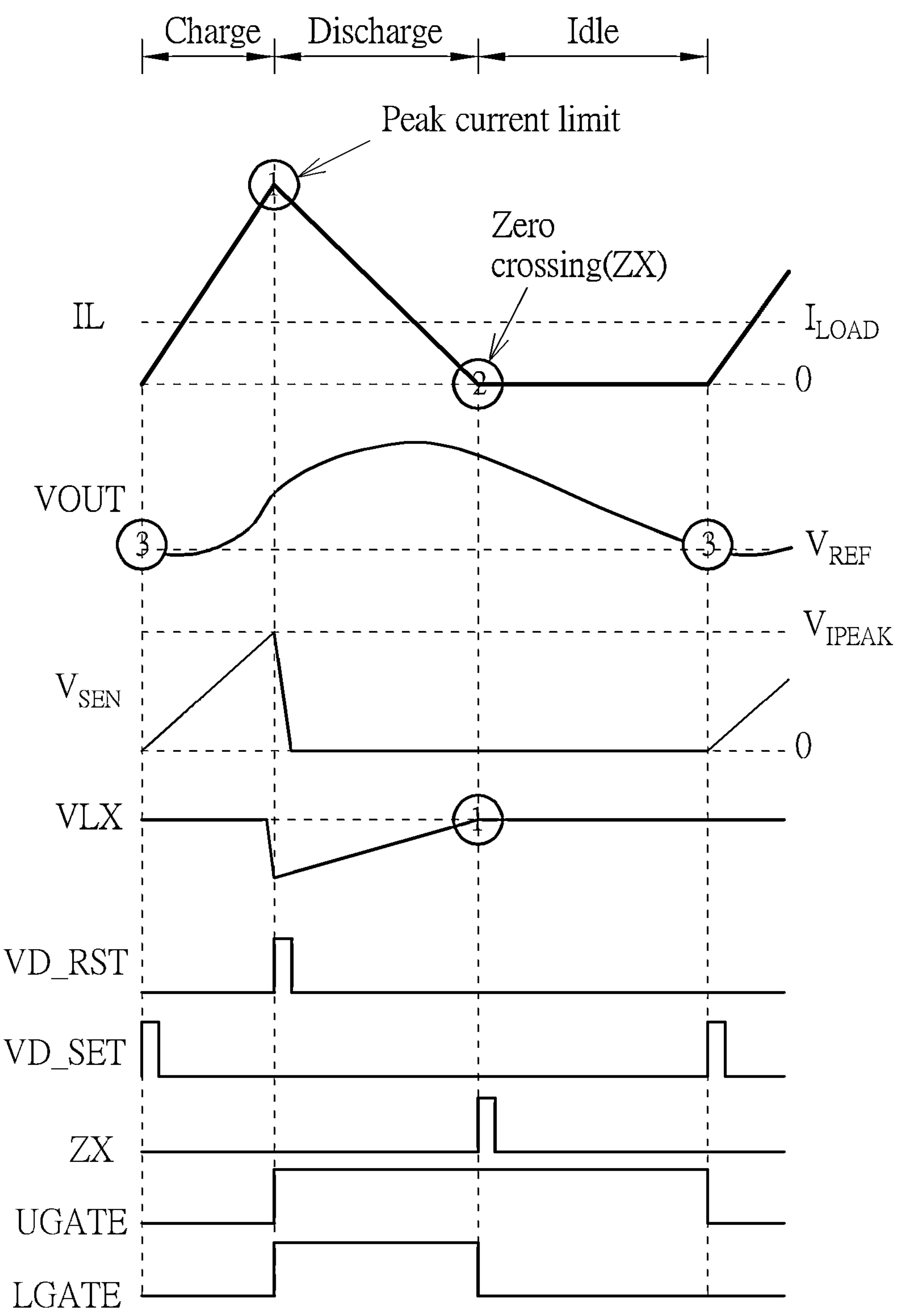
FIG. 2 is a diagram illustrating waveforms of different signals of the PFM converter shown in FIG. 1.

Please refer to FIG. 2 in conjunction with FIG. 1. FIG. 2 is a diagram illustrating waveforms of different signals of the PFM converter 100 shown in FIG. 1. For better comprehension of technical features of the present invention, the principle of the PFM control employed by the PFM converter 100 is briefly described as below. When the output voltage VOUT drops below the reference voltage $V_{REF}$, the feedback control signal VD_SET is set by the logic high level (i.e., VD_SET=1). Hence, the output node of the SR latch circuit 112 is set by the logic high level (i.e., Q=1) in response to the set input node of the SR latch circuit 112 being asserted (i.e., S=VD_SET=1). Since the output node of the SR latch circuit 112 is set by the logic high level (i.e., Q=1), the high-side power switch circuit (PMOS transistor MP) is turned on, and the low-side power switch circuit (NMOS transistor MN) is turned off. The inductor current IL increases due to charging via the turned-on high-side power switch circuit (PMOS transistor MP).

When the inductor current IL reaches a peak current limit, the sensed voltage signal $V_{SEN}$ (which has a voltage representative of the inductor current IL) reaches the target peak current value $V_{IPEAK}$ (which is a voltage level indicative of the peak current limit of the inductor current), and the feedback control signal VD_RST is set by the logic high level (i.e., VD_RST=1). Hence, the output node of the SR latch circuit 112 is reset by the logic low level (i.e., Q=0) in response to the reset input node of the SR latch circuit 112 being asserted (i.e., R=VD_RST=1). Since the output node of the SR latch circuit 112 is reset to the logic low level (i.e., Q=0), the high-side power switch circuit (PMOS transistor MP) is turned off, and the low-side power switch circuit (NMOS transistor MN) is turned on. The inductor current IL decreases due to discharging via the turned-on low-side power switch circuit (NMOS transistor MN). At this moment, the voltage VLX becomes negative due to the fact that the inductor current IL should be continuous. Next, the voltage VLX increases during a period in which the inductor current IL decreases.

When the voltage VLX crosses over the ground voltage GND, the feedback control signal ZX has a level transition from the logic low level (i.e., ZX=0) to the logic high level (i.e., ZX=1), which in turn makes the switch control circuit 114 turn off the low-side power switch circuit (NMOS transistor MN). Hence, both of the high-side power switch circuit (PMOS transistor MP) and the low-side power switch circuit (NMOS transistor MN) are turned off, thereby making the PFM converter 100 become idle.

The comparator circuit 116 monitors the output voltage VOUT of the PFM converter 100 to control a starting time of an inductor charging state (labeled by "3" in FIG. 2). The comparator circuit 120 monitors a peak value of the inductor current IL of the PFM converter 100 to control an ending time of an inductor charging state and a starting time of an inductor discharging state (labeled by "1" in FIG. 2). The comparator circuit 122 monitors zero-crossing of the voltage VLX (i.e., zero-crossing of the inductor current IL) to control an ending time of an inductor discharging state (labeled by "2" in FIG. 2). However, due to certain factors, the actual timing of stopping the inductor charging state and/or the actual timing of stopping the inductor discharging state may be deviated from expected timing illustrated in FIG. 2. As a result, power efficiency degrades due to non-ideal state switching. To address this power efficiency degradation issue, the present invention proposes using the calibration circuit 124 to calibrate at least one circuit of the PFM converter 100 under a calibration mode. For example, the at least one circuit of the PFM converter 100 may include one or both of the comparator circuits 120 and 122. For another example, the calibration mode may be a power-on calibration (POK) mode or a background calibration mode. Further details of the calibration circuit 124 are described as below with reference to the accompanying drawings.

Figure 3:
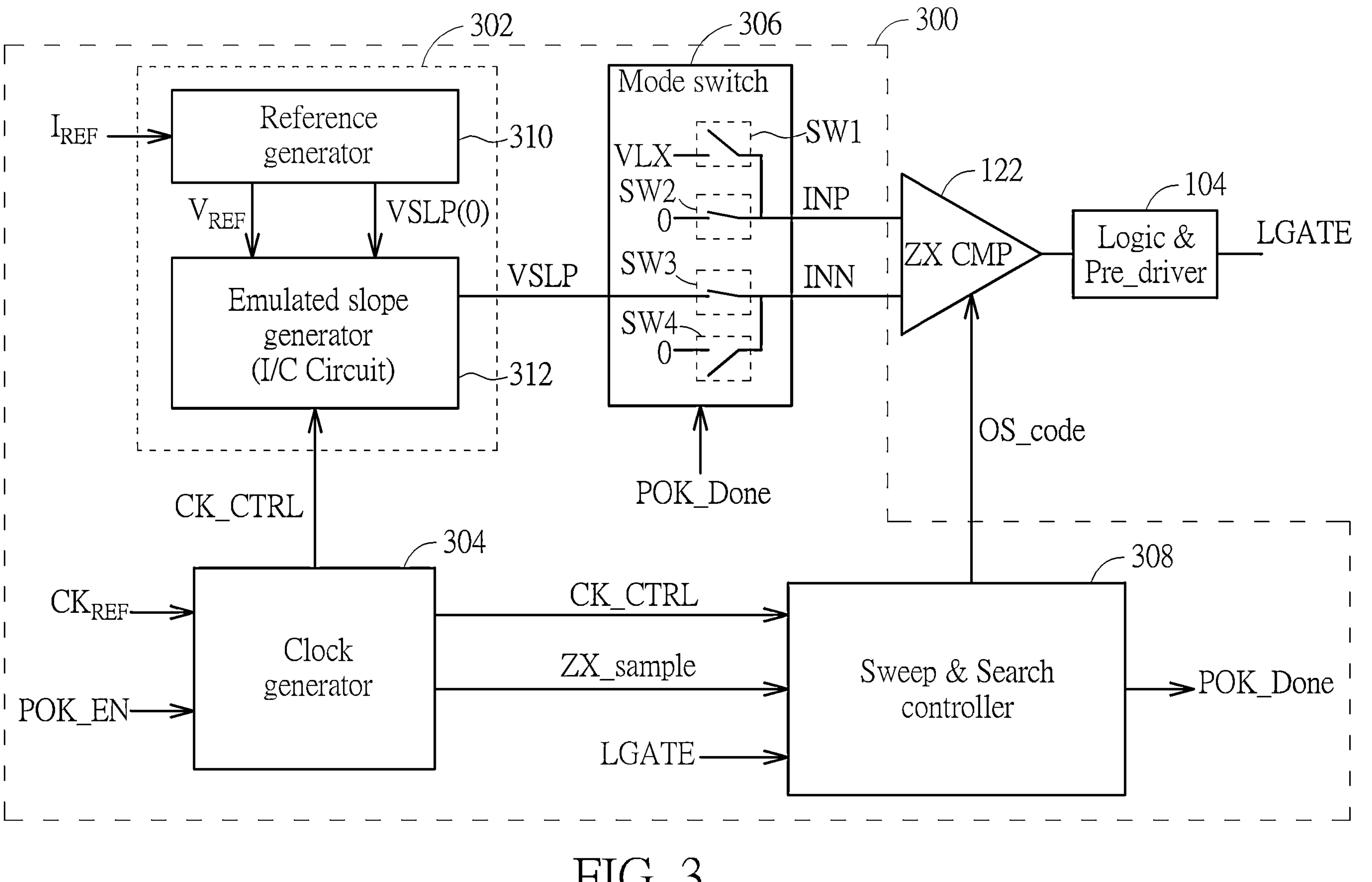
FIG. 3 is a diagram illustrating a calibration circuit used under a power-on calibration mode according to an embodiment of the present invention.

FIG. 3 is a diagram illustrating a calibration circuit used under a power-on calibration mode according to an embodiment of the present invention. The calibration circuit 300 includes a signal generator circuit 302, a clock generator circuit (labeled by "clock generator") 304, a mode switch circuit (labeled by "mode switch") 306, and a calibration control circuit (labeled by "sweep & search controller") 308, where the signal generator circuit 302 includes a reference generator circuit (labeled by "reference generator") 310 and an emulated slope generator circuit (labeled by "emulated slope generator") 312. The calibration circuit 124 shown in FIG. 1 may be implemented using the calibration circuit 300. In this embodiment, the calibration circuit 300 is used to calibrate the comparator circuit (labeled by "ZX CMP") 122 by searching for a proper input DC offset VOS, where the input DC offset VOS is calibrated to ensure that a level transition of the output signal LGATE of the PFM control circuit (labeled by "logic & pre_driver") 104 occurs at the expected timing.

The signal generator circuit 302 is arranged to perform slope prediction for generating and outputting an emulated slope signal VSLP to a comparator circuit (e.g., comparator circuit 122) under a calibration mode (e.g., power-on calibration mode), where the emulated slope signal VSLP has an emulated slope $$\frac{d(VSLP)}{dt}$$

following an initial voltage VSLP(0), and the emulated slope $$\frac{d(VSLP)}{dt}$$

corresponds to a slope of a sensed signal indicative of electrical characteristic of the inductor L of the PFM converter 100. In this embodiment, the emulated slope $$\frac{d(VSLP)}{dt}$$

corresponds to a slope $$\frac{d(VLX)}{dt}$$

of the voltage VLX sensed from one terminal LX of the inductor L. Specifically, the comparator circuit 122 has a non-inverting input node INP and an inverting input node INN, and the mode switch circuit 306 has a plurality of switches SW1, SW2, SW3, SW4. When the PFM converter 100 operates in a normal mode, the switches SW1, SW4 are switched on and the switches SW2, SW3 are switched off, thereby passing the voltage VLX and the ground voltage (e.g., 0V) to the non-inverting input node INP and the inverting input node INN, respectively. When the PFM converter 100 operates in a calibration mode (e.g., power-on calibration mode), the switches SW1, SW4 are switched off and the switches SW2, SW3 are switched on, thereby passing the ground voltage (e.g., 0V) and the emulated slope signal VSLP to the non-inverting input node INP and the inverting input node INN, respectively.

As shown in FIG. 2, during a period in which the voltage VLX is negative and increases as the inductor current IL decreases, the comparator circuit 122 is used to detect the occurrence of zero-crossing of the voltage VLX under the normal mode. From hardware's viewpoint, generating a positive voltage is easier than generating a negative voltage. In this embodiment, the emulated slope signal VSLP generated from the signal generator circuit 302 has the initial voltage VSLP(0) set by a positive voltage and the emulated slope set by a negative slope. As shown in FIG. 2, when zero-crossing of the voltage VLX occurs under the normal mode, the output signal LGATE of the PWM control circuit 104 has a level transition from a logic high level "1" to a logic low level "0". To keep the same output polarity of the output signal LGATE under the calibration mode, the emulated slope signal VSLP (which has a positive initial voltage and a negative slope) is supplied to the inverting node INN of the comparator circuit 122.

The calibration control circuit 308 is arranged to refer to an output signal that is generated from the PFM control circuit 104 in response to an output signal of the comparator circuit 122, to calibrate at least one circuit of the PFM converter 100 under the calibration mode. In this embodiment, the output signal LGATE is received by the calibration control circuit 308, and the comparator circuit 122 is calibrated by a target control setting OS_code found by the calibration control circuit 308 during the calibration mode, where the target control setting OS_code sets the input DC offset VOS of the comparator circuit 122 (i.e., a DC offset of an input differential pair of the comparator circuit 122) when the comparator circuit 122 operates under the normal mode.

Figure 4:
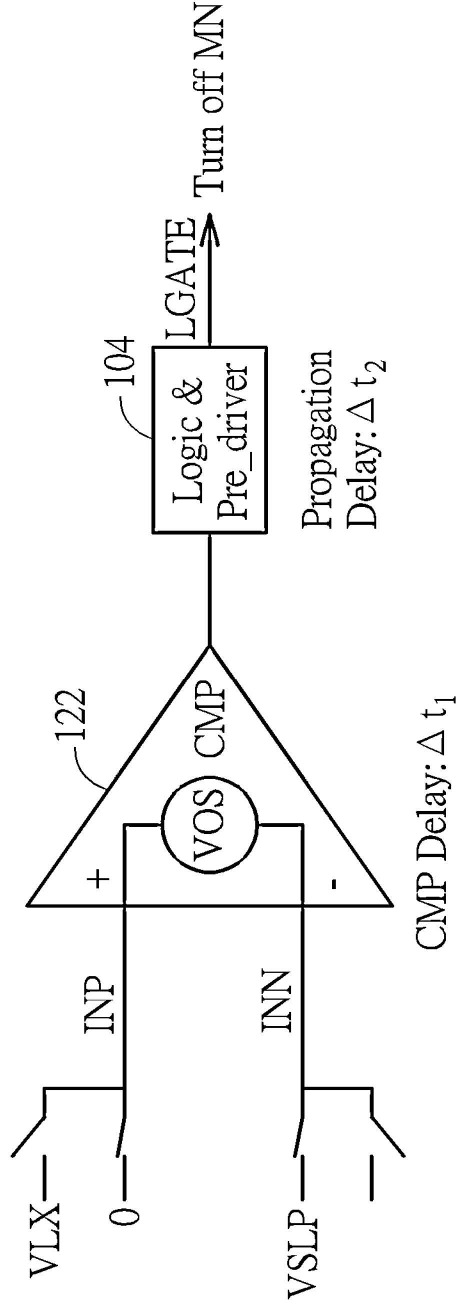
FIG. 4 is a diagram illustrating a zero-crossing path under the calibration mode.
Figure 5:
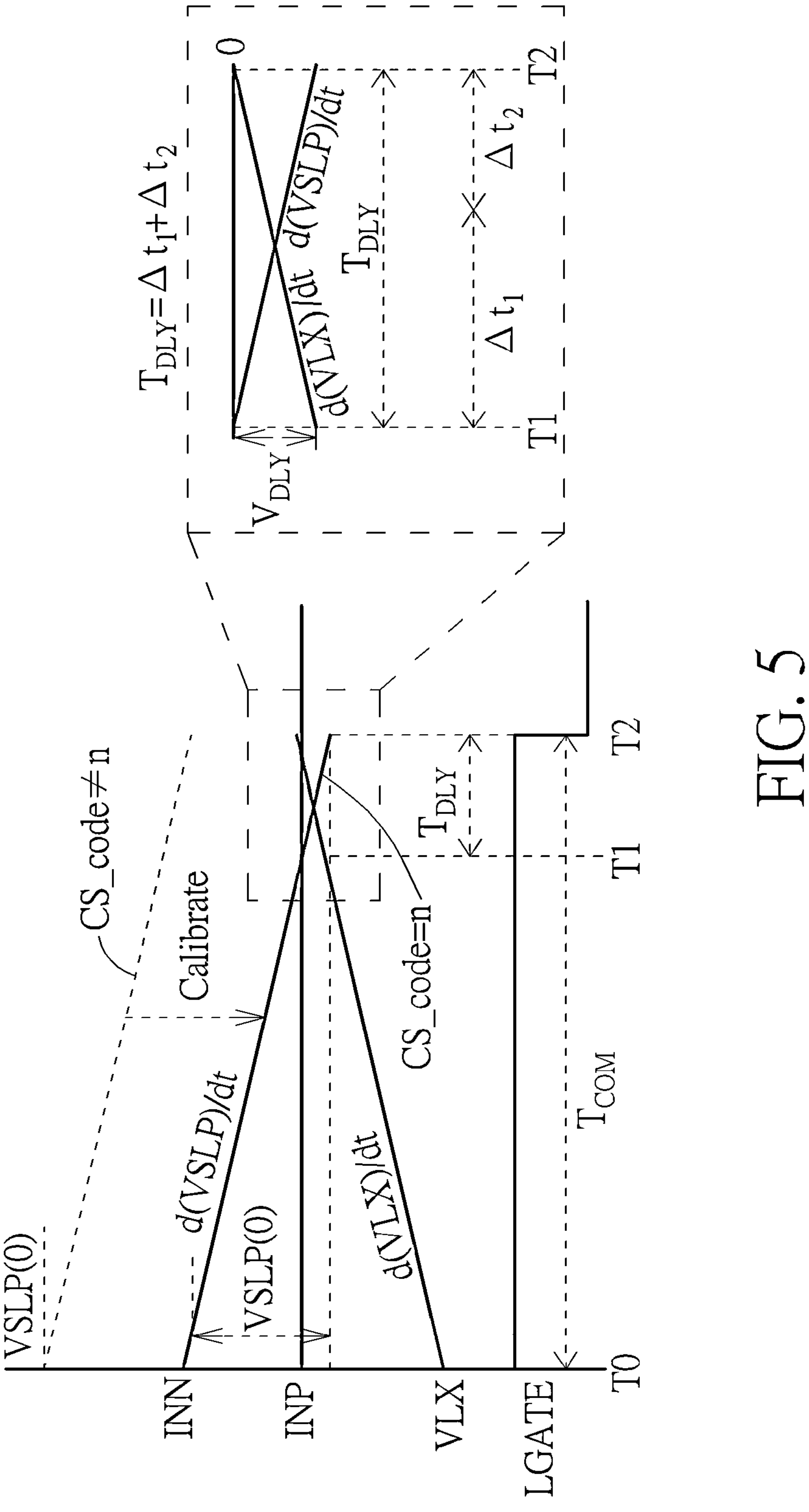
FIG. 5 is a diagram illustrating a concept of calibrating the zero-crossing path by the proposed emulated slope signal.

Please refer to FIG. 4 in conjunction with FIG. 5. FIG. 4 is a diagram illustrating a zero-crossing (ZX) path under the calibration mode. FIG. 5 is a diagram illustrating a concept of calibrating the ZX path by the proposed emulated slope signal. As shown in FIG. 4, the comparator circuit 122 has an input DC offset VOS and a comparator delay $\Delta t_1$, and the PEM control circuit 104 has a propagation delay $\Delta t_2$. Hence, the comparator circuit 122 detects a ZX event when the emulated slope signal VSLP (which is connected to the inverting input node INN of the comparator circuit 122) is equal to −VOS; the comparator output of the comparator circuit 122 has a delayed level transition in response to detection of the ZX event; and the output signal LGATE of the PFM control circuit 104 has a delayed level transition in response to the comparator output of the comparator circuit 122. The total delay $T_{DLY}$ of the ZX path is equal to $\Delta t_1+\Delta t_2$. As shown in FIG. 5, the voltage VLX starts to ramp up at the time instance T0 (i.e., the time instance at which the inductor current IL reaches the peak current limit), and is expected to cross over the ground voltage at the time instance T2 (T2=T0+$T_{COM}$). The input DC offset VOS of the comparator circuit 122 is adjusted by the control setting OS_code output from the calibration circuit 300. With a proper setting of the input DC offset VOS (e.g., VOS=$V_{DLY}$ @ OS_code=n), the comparator circuit 122 detects a ZX event at time instance T1, and the output signal LGATE has a level transition at the time instance T2 (T2=T1+$\Delta t_1+\Delta t_2$). The initial voltage VSLP(0) of the emulated slope signal VSLP may be designed based on the following formula.

$$VSLP(0)-0=\frac{d}{dt}VLX\times T_{COM} \tag{1}$$

The emulated slope of the emulated slope signal VSLP may be designed based on the following formula.

$$\left|\frac{d}{dt}VLX\right|=\left|\frac{d}{dt}VSLP\right| \tag{2}$$

The DC offset and the delay variation are all calibrated to make the output signal LGATE has a level transition (1→0) at or around the time instance T2 at which the voltage VLX crosses over the ground voltage.

To find the proper setting of the input DC offset VOS (e.g., OS_code=n) that can make the output signal LGATE have a level transition (1→0) at or around the time instance T2, the present invention proposes a calibration flow that sweeps a plurality of different candidate control settings OS_code of the input DC offset VOS according to a control clock CK_CTRL. As shown in FIG. 3, the clock generator circuit 304 receives a process-independent clock $CK_{REF}$ as a reference clock, generates the control clock CK_CTRL according to the process-independent clock $CK_{REF}$, and outputs the control clock CK_CTRL to the signal generator circuit 302 and the calibration control circuit 308 when the power-on calibration mode is enabled by POK_EN=1. In addition, the clock generator circuit 304 generates and outputs a sampling clock ZX_sample to the calibration control circuit 308. The signal generator circuit 302 periodically resets the emulated slope signal VSLP to the initial voltage VSLP(0) according to the control clock CK_CTRL, and the calibration control circuit 308 sweeps different candidate control settings OS_code of the input DC offset VOS according to the control clock CK_CLK, to search for a target control setting OS_code of the input DC offset VOS that can make the output signal LGATE have a level transition (1→0) at or around the desired timing.

For example, a half cycle of the control clock CK_CTRL is equal to $T_{COM}$ ($T_{COM}$=T2−T0), the emulated slope signal VSLP is reset at the end of one cycle of the control clock CK_CTRL if the output signal LGATE does not have a level transition (1→0) during one $T_{COM}$ period under a current control setting OS_code of the input DC offset VOS, and the calibration control circuit 308 selects a next control setting OS_code for one $T_{COM}$ period of a next cycle of the control clock CK_CTRL if the output signal LGATE does not have a level transition (1→0) during one $T_{COM}$ period of a current cycle of the control clock CK_CTRL.

Figure 6:
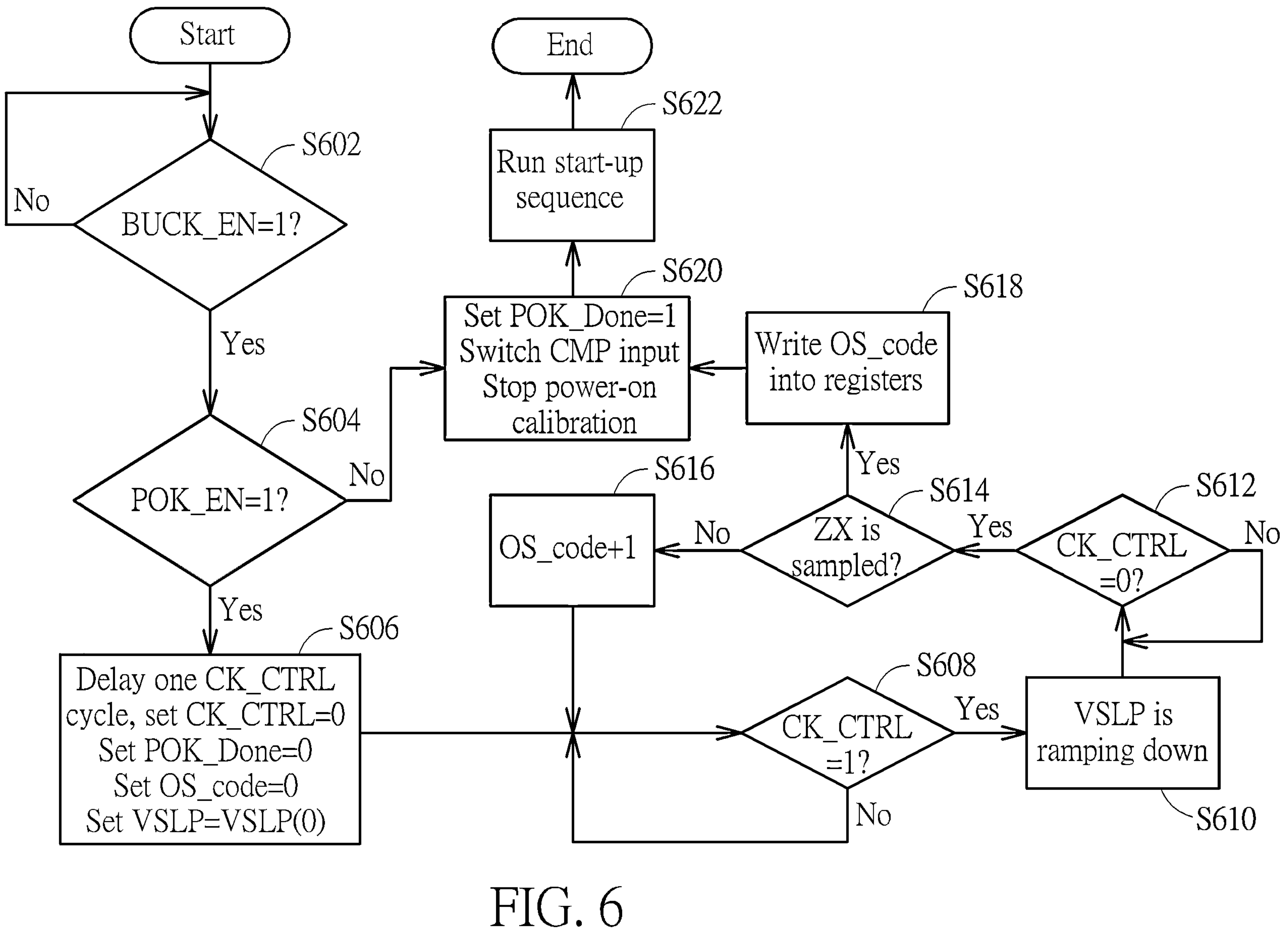
FIG. 6 is a flowchart illustrating a power-on calibration method according to an embodiment of the present invention.
Figure 7:
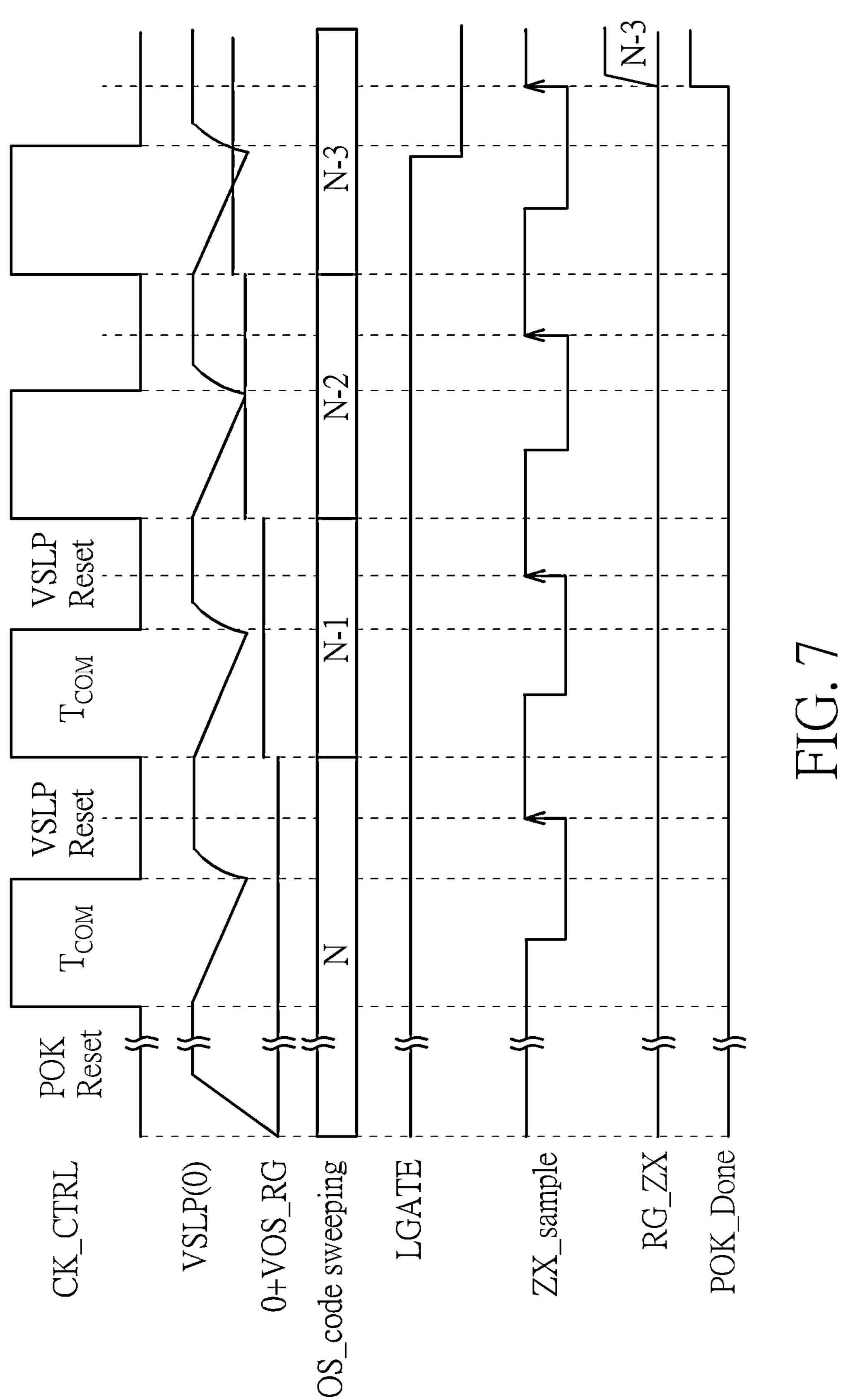
FIG. 7 is a diagram illustrating waveforms of different signals of the calibration circuit shown in FIG. 3.

Please refer to FIG. 6 in conjunction with FIG. 7. FIG. 6 is a flowchart illustrating a power-on calibration method according to an embodiment of the present invention. FIG. 7 is a diagram illustrating waveforms of different signals of the calibration circuit 300 shown in FIG. 3. The calibration method may be employed by the calibration circuit 300 shown in FIG. 3. Provided that the result is substantially the same, the steps are not required to be executed in the exact order shown in FIG. 6. After the PFM converter 100 is powered on (BUCK_EN=1) and the power-on calibration is enabled (POK_EN=1), the calibration circuit 300 starts to calibrate the input DC offset VOS of the comparator circuit 122 (steps S602, S604, and S606). At step S606, the clock generator circuit 304 sets the control clock CK_CTRL to 0 (CK_CTRL=0) for resetting the power-on calibration, the calibration control circuit 308 sets the control signal POK_Done to 0 (POK_Done=0) for instructing the mode switch circuit 306 to select the ground voltage (e.g., 0V) and the emulated slope signal VSLP as inputs of the comparator circuit 122 under the power-on calibration mode, the calibration control circuit 308 sets the control setting OS_code to 0 (OS_code=0) for selecting an initial value VOS_RG of the input DC offset VOS of the comparator circuit 122 (e.g., a positive maximum of the input DC offset VOS of the comparator circuit 122 or a negative maximum of the input DC offset VOS of the comparator circuit 122, depending upon actual design considerations), and the signal generator circuit 302 sets the emulated slope signal VSLP to the initial voltage VSLP(0).

When the control clock CK_CTRL generated from the clock generator circuit 304 is switched from 0 to 1 (CK_CTRL=1), the emulated slope signal VSLP generated from the signal generator circuit 302 starts to ramp down (steps S608 and S610). When the control clock CK_CTRL generated from the clock generator circuit 304 is switched from 1 to 0 (CK_CTRL=0) at end of one period $T_{COM}$, the signal generator circuit 302 resets the emulated slope signal VSLP to the initial voltage VSLP(0). During a period in which the control clock CK_CTRL is set by 0, the calibration control circuit 308 is triggered by the ZX sampling clock ZX_sample to sample the output signal LGATE to determine if the output signal LGATE has a level transition (1→0) under a current control setting OS_code. If it is determined that the output signal LGATE does not have a level transition (1→0) yet, the calibration control circuit 308 increases the control setting OS_code (e.g., OS_code=OS_code+1) for selecting a next value VOS_RG of the input DC offset VOS of the comparator circuit 122. For example, when OS_code=0 selects the positive maximum of the input DC offset VOS of the comparator circuit 122, OS_code+1 is to reduce the input DC offset VOS of the comparator circuit 122. For another example, when OS_code=0 selects the negative maximum of the input DC offset VOS of the comparator circuit 122, OS_code+1 is to increase the input DC offset VOS of the comparator circuit 122. Steps S608, S610, S612, S614, S616 are repeated until the calibration control circuit 308 determines that the output signal LGATE has a level transition (1→0) at step S614. At step S618, the calibration control circuit 308 writes the current control setting OS_code into a storage device (e.g., registers) as a target control setting RG_ZX of the input DC offset VOS of the comparator circuit 122, wherein the target control setting RG_ZX found by the power-on calibration will be applied to the comparator circuit 122 under the normal mode. At step S620, the calibration control circuit 308 sets the control signal POK_Done to 1 (POK_Done=1) for instructing the mode switch circuit 306 to select the ground voltage and the voltage VLX as inputs of the comparator circuit 122 under the normal mode, and the calibration circuit 300 is powered off to stop the power-on calibration. At step S622, the PFM converter 100 runs a start-up sequence to enter the normal mode.

Figure 8:
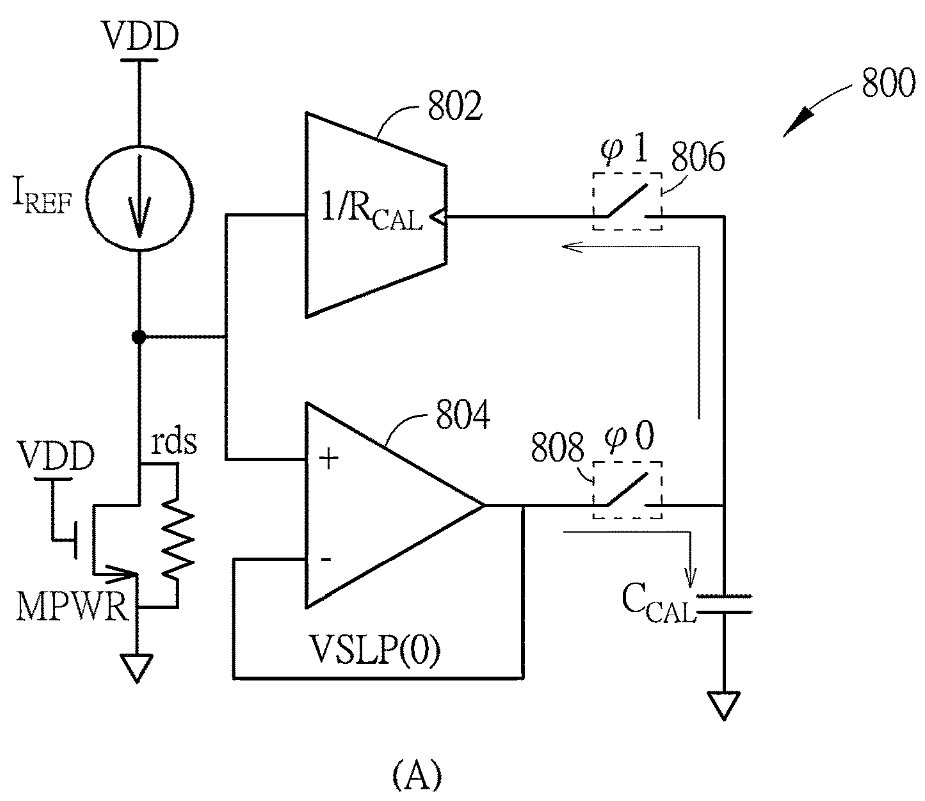
FIG. 8 is a diagram illustrating an example of an I over C slope generation circuit according to an embodiment of the present invention.
Figure 8:
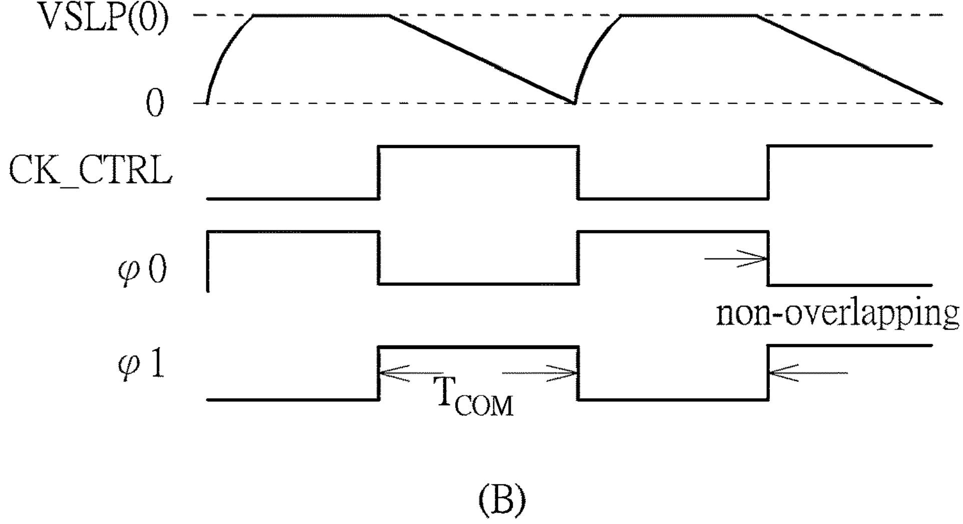

As mentioned above, the signal generator circuit 302 is used to generate the emulated slope signal VSLP with a positive initial voltage VSLP(0) and a negative slope. In one embodiment of the present invention, the signal generator circuit 302 may be implemented using a current (I) over capacitor (C) slope generation circuit. FIG. 8 is a diagram illustrating an example of an I over C slope generation circuit according to an embodiment of the present invention. As shown in sub-diagram (A) of FIG. 8, the I over C slope generation circuit 800 includes a power transistor (NMOS transistor) MPWR with channel resistance rds, a current source $I_{REF}$, a capacitor $C_{CAL}$, a voltage (V) to current (I) converter 802, a unity-gain buffer 804, and a plurality of switches 806, 808, where the switches 806, 808 are controlled by non-overlapping clocks as illustrated in sub-diagram (B) of FIG. 8. The initial voltage VSLP(0) of the emulated slope signal VSLP may be designed based on the following formula.

$$VSLP(0) = VSLP \times T_{COM} = I_{REF} \times rds \tag{3}$$

The emulated slope of the emulated slope signal VSLP may be designed based on the following formulas.

$$V_{REF} = I_{REF} \times rds \tag{4}$$

$$\frac{d}{dt}VSLP = -\frac{I_{REF} \times rds}{R_{CAL} \times C_{CAL}} \tag{5}$$

The rds variation generates the gain error which makes the VLX slope vary with positive correlation. In this embodiment, the emulated slope $$\frac{d}{dt}VSLP$$

and the initial voltage VSLP(0) are designed for rds-positive-variation, which is the same as the VLX slope. In this way, the gain error caused by rds is also calibrated. It should be noted that the total delay $T_{DLY}$ $$\left(T_{DLY} = \frac{VOS}{\frac{d}{dt}VSLP}\right)$$

is rds independent.

Figure 9:
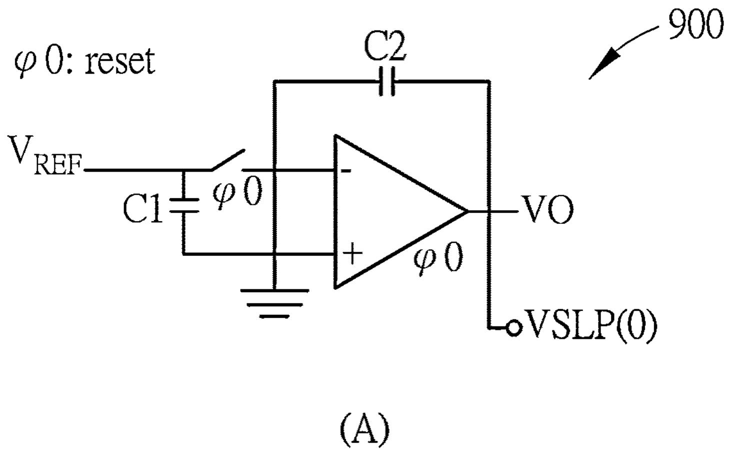
FIG. 9 is a diagram illustrating different phases of an SC slope generation circuit 900.
Figure 9:
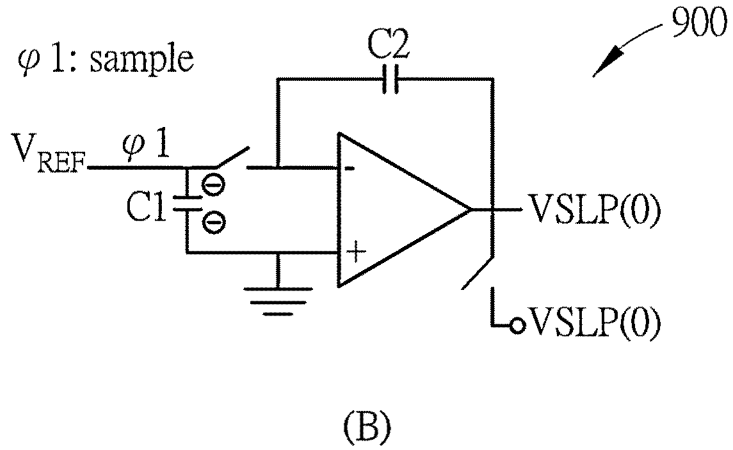
Figure 9:
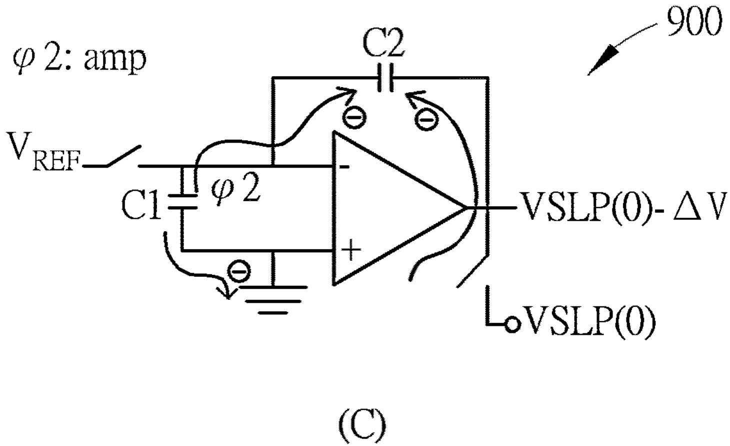
Figure 10:
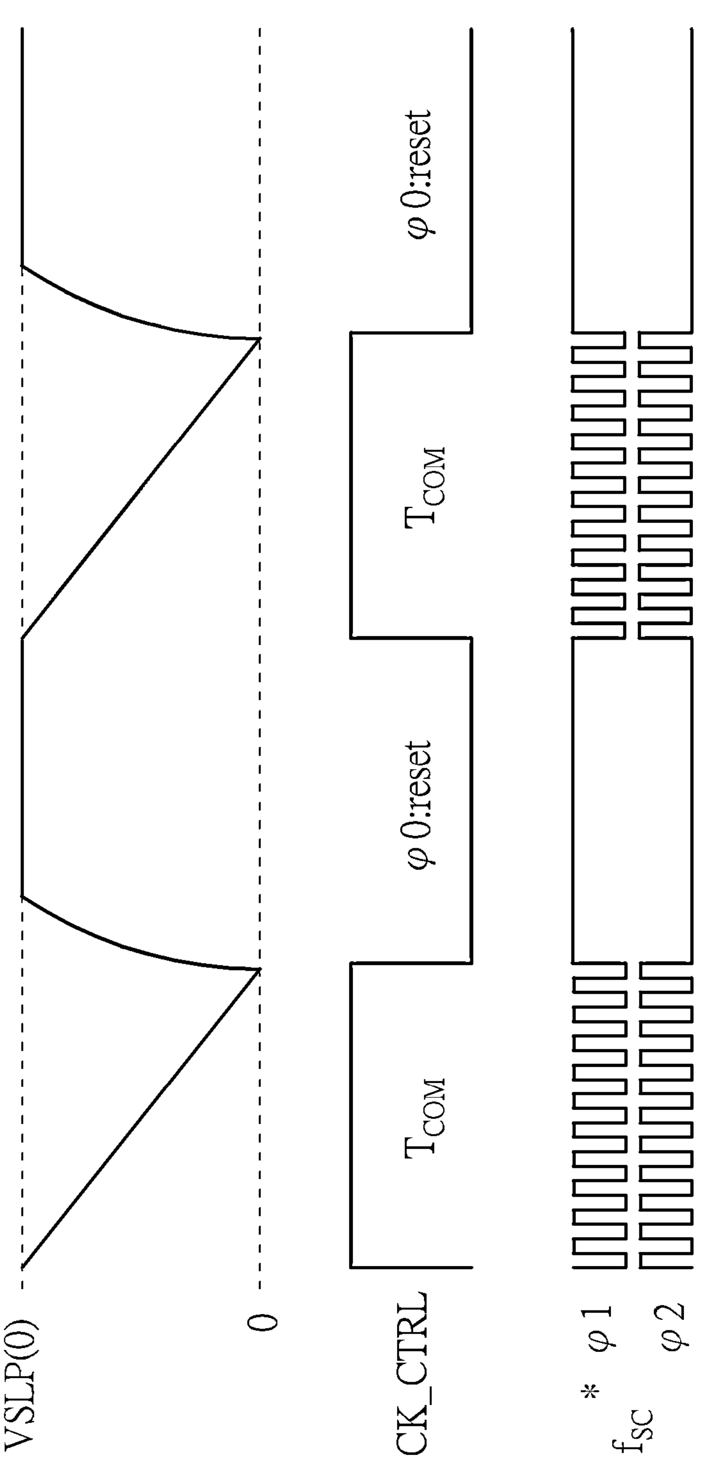
FIG. 10 is a diagram illustrating waveforms of different signals of the SC slope generation circuit shown in FIG. 9.

It should be noted that the present invention has no limitations on implementation of the signal generator circuit 302. In another embodiment of the present invention, the signal generator circuit 302 may be implemented using a switched-capacitor (SC) slope generation circuit. FIG. 9 is a diagram illustrating different phases of an SC slope generation circuit 900. FIG. 10 is a diagram illustrating waveforms of different signals of the SC slope generation circuit 900 shown in FIG. 9. The initial voltage VSLP(0) of the emulated slope signal VSLP may be designed based on the following formula.

$$VSLP(0) = VSLP \times T_{COM} = K \times I_{REF} \times rds \tag{6}$$

The emulated slope of the emulated slope signal VSLP may be designed based on the following formulas.

$$V_{REF} = I_{REF} \times rds \tag{7}$$

$$\frac{d}{dt}VSLP = -\frac{C_1}{C_2} \times I_{REF} \times rds \times f_{SC} \tag{8}$$

In above embodiments, the calibration circuit 124 shown in FIG. 1 may be implemented using the calibration circuit 300 shown in FIG. 3 for power-on calibration. Hence, calibration of the PFM converter 100 is performed once each time the PFM converter 100 is powered on. However, this is for illustrative purposes only, and is not meant to be a limitation of the present invention. The same concept of calibrating a PFM converter by using an emulated slope signal can be adopted in a background calibration design.

Figure 11:
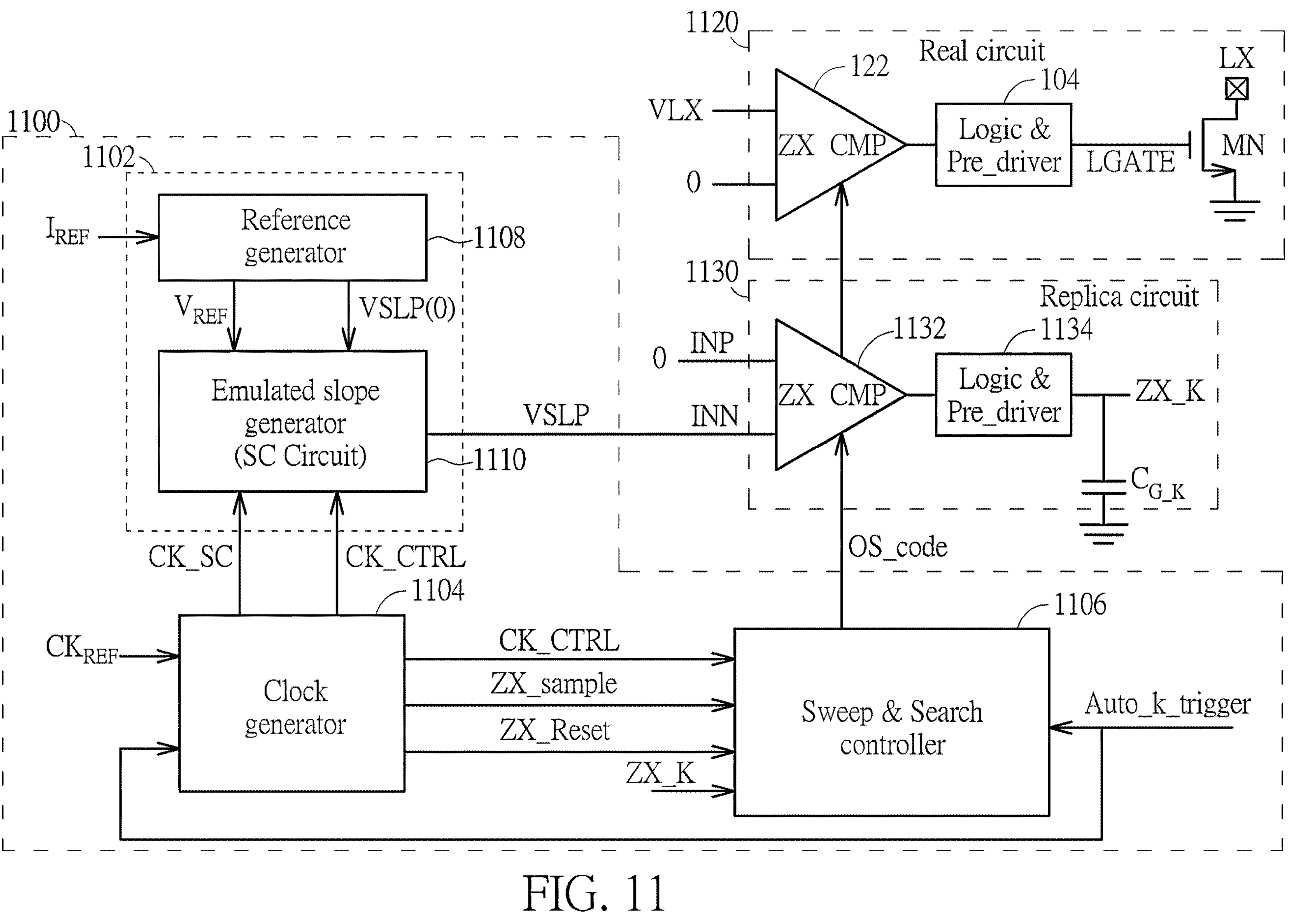
FIG. 11 is a diagram illustrating a calibration circuit used under a background calibration mode according to an embodiment of the present invention.

FIG. 11 is a diagram illustrating a calibration circuit used under a background calibration mode according to an embodiment of the present invention. The PFM converter 100 may further include a replica circuit 1130 that suffers the same power supply and temperature effect as the real circuit 1120, where the real circuit 1120 is involved in regulating the output voltage VOUT of the PFM converter 100 for a load device, and the replica circuit 1130 is used for background calibration only and is not involved in regulating the output voltage VOUT of the PFM converter 100 for a load device. As shown in FIG. 11, the comparator circuit (labeled by "ZX CMP") 1132 is a replica of the comparator circuit 122 shown in FIG. 1, the PFM control circuit (labeled by "logic & pre_driver") 1134 is a replica of the PFM control circuit 104 shown in FIG. 1, the capacitor $C_{G\_K}$ is designed to have the estimated capacitance of the low-side power switch circuit (NMOS transistor MN), and the output signal ZX_K has the estimated voltage of the output signal LGATE.

The calibration circuit 1100 includes a signal generator circuit 1102, a clock generator circuit (labeled by "clock generator") 1104, and a calibration control circuit (labeled by “sweep & search controller”) 1106, where the signal generator circuit 1102 includes a reference generator circuit (labeled by “reference generator”) 1108 and an emulated slope generator circuit (labeled by “emulated slope generator”) 1110. The calibration circuit 124 shown in FIG. 1 may be implemented using the calibration circuit 1100. In this embodiment, the calibration circuit 1100 is used to calibrate the comparator circuit 122 by using the replica circuit 1130 to search for a proper input DC offset VOS under background calibration, where the input DC offset VOS of the comparator circuit 122 is calibrated to ensure that a level transition of the output signal LGATE of the PFM control circuit 104 occurs at or around the expected timing.

The signal generator circuit 1102 is arranged to generate and output an emulated slope signal VSLP to the comparator circuit (replica circuit) 1132 under background calibration mode, where the emulated slope signal VSLP has an emulated slope $$\frac{d(VSLP)}{dt}$$

following an initial voltage VSLP(0), and the emulated slope $$\frac{d(VSLP)}{dt}$$

corresponds to a slope of a sensed signal indicative of electrical characteristic of the inductor L of the PFM converter 100. In this embodiment, the emulated slope $$\frac{d(VSLP)}{dt}$$

corresponds to a slope $$\frac{d(VLX)}{dt}$$

of the voltage VLX sensed from one terminal LX of the inductor L. Specifically, the comparator circuit 1132 has a non-inverting input node INP and an inverting input node INN. From hardware’s viewpoint, generating a positive voltage is easier than generating a negative voltage. In this embodiment, the emulated slope signal VSLP generated from the signal generator circuit 1100 has the initial voltage VSLP(0) set by a positive voltage and the emulated slope set by is a negative slope. The signal generator circuit 1102 may employ an SC slope generation circuit (e.g., SC slope generation circuit 900). Hence, the clock generator circuit 1104 further generates and outputs a control clock CK_SC needed by the SC slope generation circuit. However, this is for illustrative purposes only, and is not meant to be a limitation of the present invention. In an alternative design, the signal generator circuit 1102 may employ an I to V slope generation circuit (e.g., I to V slope generation circuit 800), and generation of the control clock CK_SC may be omitted from the clock generator circuit 1104.

The calibration control circuit 1106 is arranged to refer to an output signal that is generated from the PFM control circuit (replica circuit) 1134 in response to an output signal of the comparator circuit (replica circuit) 1132, to calibrate at least one circuit (real circuit) of the PFM converter 100. In this embodiment, the output signal ZX_K of the PFM control circuit (replica circuit) 1134 is received by the calibration control circuit 1106, and the comparator circuit 122 is calibrated by a final control setting OS_code recorded by the calibration control circuit 1106, where the final control setting OS_code is determined through sweeping a plurality of different candidate control settings OS_code of the input DC offset VOS of the comparator circuit 1132.

Figure 12:
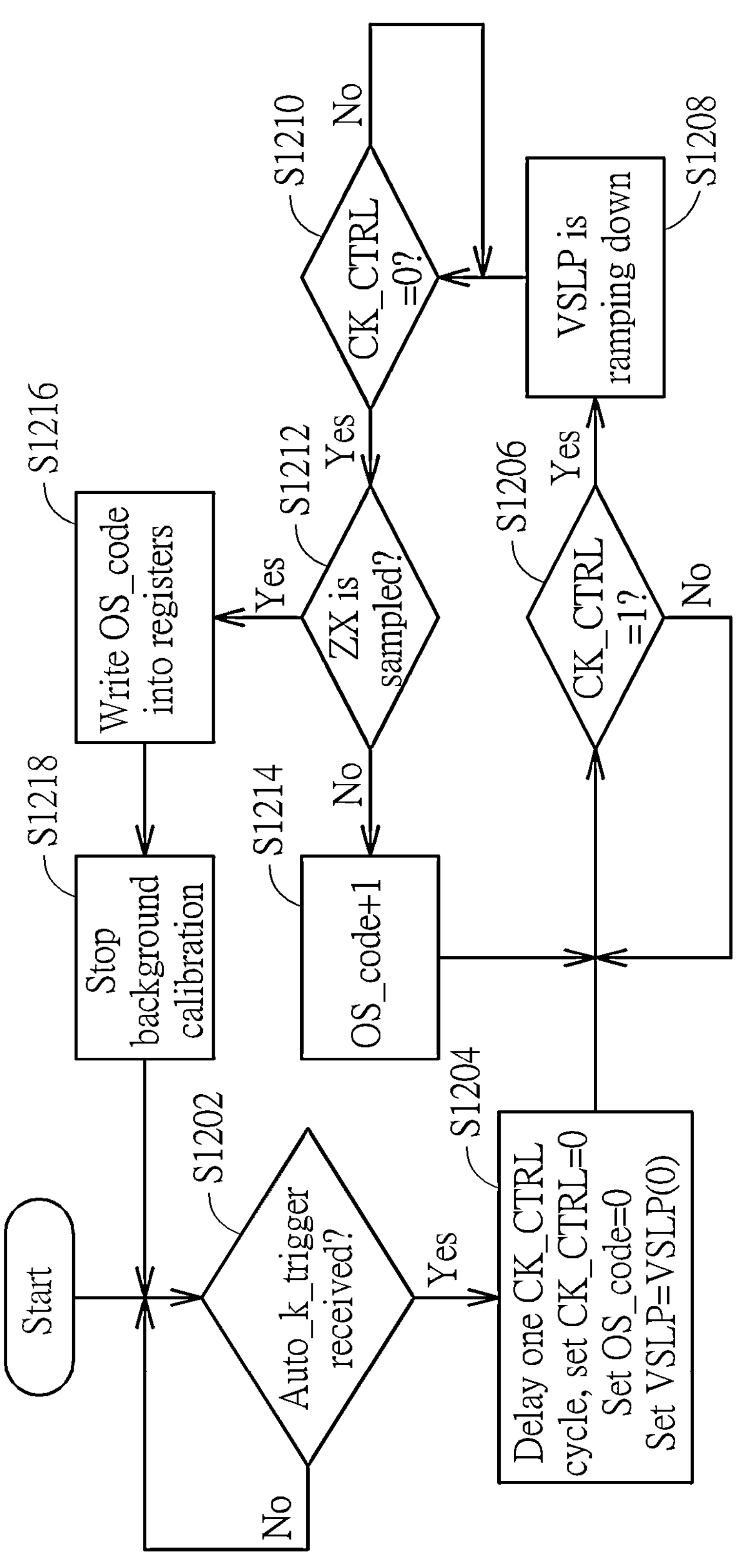
FIG. 12 is a flowchart illustrating a background calibration method according to an embodiment of the present invention.

FIG. 12 is a flowchart illustrating a background calibration method according to an embodiment of the present invention. The calibration method may be employed by the calibration circuit 1100 shown in FIG. 11. Provided that the result is substantially the same, the steps are not required to be executed in the exact order shown in FIG. 12. After a trigger pulse Auto_k_trigger is received, the calibration circuit 1100 starts background calibration of the comparator circuit 122 of the PFM converter 100 (step S1202 and S1204). The trigger pulse Auto_k_trigger can be sent periodically or one-shot from the system if needed. At step S1204, the clock generator circuit 1104 sets the control clock CK_CTRL to 0 (CK_CTRL=0) for resetting the background calibration, the calibration control circuit 1106 sets the control setting OS_code to 0 (OS_code=0) for selecting an initial value of the input DC offset VOS of the comparator circuit 1132 (e.g., a positive maximum of the input DC offset VOS of the comparator circuit 1132 or a negative maximum of the input DC offset VOS of the comparator circuit 1132, depending upon actual design considerations), and the signal generator circuit 1102 sets the emulated slope signal VSLP to the initial voltage VSLP(0).

When the control clock CK_CTRL generated from the clock generator circuit 1104 is switched from 0 to 1 (CK_CTRL=1), the emulated slope signal VSLP generated from the signal generator circuit 1102 starts to ramp down (steps S1206 and S1208). When the control clock CK_CTRL generated from the clock generator circuit 1104 is switched from 1 to 0 (CK_CTRL=0), the signal generator circuit 1102 resets the emulated slope signal VSLP to the initial voltage VSLP(0). During a period in which the control clock CK_CTRL is set by 0, the calibration control circuit 1106 is triggered by the ZX sampling clock ZX_sample to sample the output signal ZX_K to determine if the output signal ZX_K has a level transition (1→0) under a current control setting OS_code. If it is determined that the output signal ZX_K does not have a level transition (1→0) yet, the calibration control circuit 1106 increases the control setting OS_code (e.g., OS_code=OS_code+1) for selecting a next value of the input DC offset VOS of the comparator circuit 122. For example, when OS_code=0 selects the positive maximum of the input DC offset VOS of the comparator circuit 122, OS_code+1 is to reduce the input DC offset VOS of the comparator circuit 122. For another example, when OS_code=0 selects the negative maximum of the input DC offset VOS of the comparator circuit 122, OS_code+1 is to increase the input DC offset VOS of the comparator circuit 122. Steps S1206, S1208, S1210, S1212, S1214 are repeated until the calibration control circuit 1106 determines that the output signal ZX_K has a level transition (1→0) at step S1212. At step S1216, the calibration control circuit 1106 writes the current control setting OS_code into a storage device (e.g., registers) as a target control setting of the input DC offset VOS of the comparator circuit 122, where the target control setting found by replica-assisted background calibration is used to calibrate the comparator circuit 122. At step S1218, the calibration circuit 1100 stops the background calibration.

In above embodiments, the calibration circuit 300/1100 is used to calibrate the comparator circuit 122 by searching for a proper input DC offset VOS, where the input DC offset VOS is calibrated to ensure that a level transition (1→0) of the output signal LGATE of the PFM control circuit 104 occurs at or around the expected timing. The same calibration concept may be applied to the comparator circuit 120. That is, the comparator circuit 120 can be calibrated by searching for a proper input DC offset VOS, where the input DC offset VOS is calibrated to ensure that a level transition (0→1) of an output signal OC (e.g., OC=LGATE or $\overline{UGATE}$) of the PFM control circuit 104 occurs at or around the expected timing.

Figure 13:
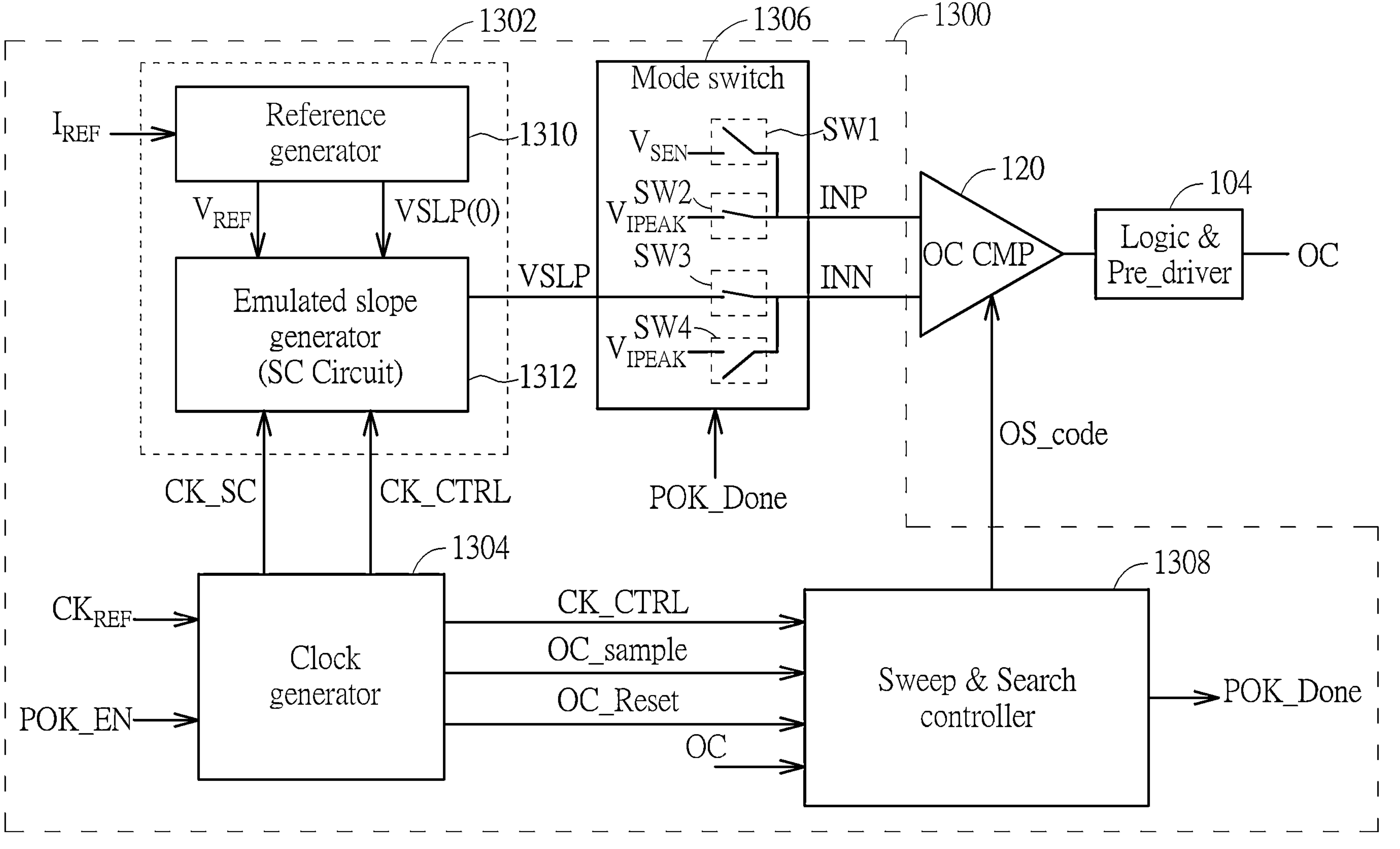
FIG. 13 is a diagram illustrating another calibration circuit used under a power-on calibration mode according to an embodiment of the present invention.

FIG. 13 is a diagram illustrating another calibration circuit used under a power-on calibration mode according to an embodiment of the present invention. The calibration circuit 1300 includes a signal generator circuit 1302, a clock generator circuit (labeled by "clock generator") 1304, a mode switch circuit (labeled by "mode switch") 1306, and a calibration control circuit (labeled by "sweep & search controller") 1308, where the signal generator circuit 1302 includes a reference generator circuit (labeled by "reference generator") 1310 and an emulated slope generator circuit (labeled by "emulated slope generator") 1312. The calibration circuit 124 shown in FIG. 1 may be implemented using the calibration circuit 1300. In this embodiment, the calibration circuit 1300 is used to calibrate the comparator circuit (labeled by "OC CMP") 120 by searching for a proper input DC offset VOS, where the input DC offset VOS is calibrated to ensure that a level transition of an output signal OC (e.g., OC=LGATE or $\overline{UGATE}$) of the PFM control circuit (labeled by "logic & pre_driver") 104 occurs at or around the expected timing.

The signal generator circuit 1302 is arranged to generate and output an emulated slope signal VSLP to a comparator circuit (e.g., comparator circuit 120) under a calibration mode (e.g., power-on calibration mode), where the emulated slope signal VSLP has an emulated slope $$\frac{d(VSLP)}{dt}$$

following an initial voltage VSLP(0), and the emulated slope $$\frac{d(VSLP)}{dt}$$

corresponds to a slope of a sensed signal indicative of electrical characteristic of the inductor L of the PFM converter 100. In this embodiment, the emulated slope $$\frac{d(VSLP)}{dt}$$

corresponds to a slope $$\frac{d(V_{SEN})}{dt}$$

of the voltage $V_{SEN}$ sensed from the inductor current IL of the inductor L.

Specifically, the comparator circuit 120 has a non-inverting input node INP and an inverting input node INN, and the mode switch circuit 1306 has a plurality of switches SW1, SW2, SW3, SW4. When the PFM converter 100 operates in a normal mode, the switches SW1, SW4 are switched on and the switches SW2, SW3 are switched off, thereby passing the voltage $V_{SEN}$ and the target peak current value $V_{IPEAK}$ (which is a voltage level indicative of a peak limit of the inductor current IL) to the non-inverting input node INP and the inverting input node INN, respectively. When the PFM converter 100 operates in a calibration mode (e.g., power-on calibration mode), the switches SW1, SW4 are switched off and the switches SW2, SW3 are switched on, thereby passing the target peak current value $V_{IPEAK}$ (which is a voltage level indicative of a peak limit of the inductor current IL) and the emulated slope signal VSLP to the non-inverting input node INP and the inverting input node INN, respectively.

The clock generator circuit 1304 receives a process-independent clock $CK_{REF}$, generates the control clock CK_CTRL according to the process-independent clock $CK_{REF}$, and outputs the control clock CK_CTRL to the signal generator circuit 1302 and the calibration control circuit 1308 when the calibration mode (e.g., power-on calibration mode) is enabled by POK_EN=1. In addition, the clock generator circuit 1304 generates a sampling clock OC_sample to the calibration control circuit 1308.

In this embodiment, the signal generator circuit 1302 may employ an SC slope generation circuit (e.g., SC slope generation circuit 900). Hence, the clock generator circuit 1304 further generates and output a control clock CK_SC needed by the SC slope generation circuit. The initial voltage VSLP(0) of the emulated slope signal VSLP may be designed based on the following formula.

$$VSLP(0) = VSLP \times T_{COM} = K \times I_{REF} \times R_{HR}, \tag{9}$$

where $R_{HR}$ is the channel resistance of the high-side power switch circuit ($PMOS$ transistor $MP$)

The emulated slope of the emulated slope signal VSLP may be designed based on the following formulas.

$$V_{REF} = I_{REF} \times R_{HR} \tag{10}$$

$$\frac{d}{dt}VSLP = -\frac{C_1}{C_2} \times I_{REF} \times R_{HR} \times f_{SC} \tag{11}$$

However, this is for illustrative purposes only, and is not meant to be a limitation of the present invention. In another embodiment, the signal generator circuit 1302 may employ an I to V slope generation circuit (e.g., I to V slope generation circuit 800), and generation of the control clock CK_SC may be omitted from the clock generator circuit 1304.

The calibration control circuit 1308 is arranged to refer to an output signal that is generated from the PFM control circuit 104 in response to an output signal of the comparator circuit 120, to calibrate at least one circuit of the PFM converter 100 under the calibration mode. In this embodiment, the output signal OC (e.g., OC=LGATE or $\overline{UGATE}$) is received by the calibration control circuit 1308, and the comparator circuit 120 is calibrated by a control setting OS_code generated from the calibration control circuit

1308, where the control setting OS_code sets the input DC offset VOS of the comparator circuit 120 (particularly, a DC offset of an input differential pair of the comparator circuit 120).

The operation principle of the calibration circuit 1300 is similar to that of the calibration circuit 300 shown in FIG. 3. As a person skilled in the art can readily understand details of the calibration circuit 1300 after reading above paragraphs directed to the calibration circuit 300, similar description of the calibration circuit 1300 is omitted here for brevity.

Figure 14:
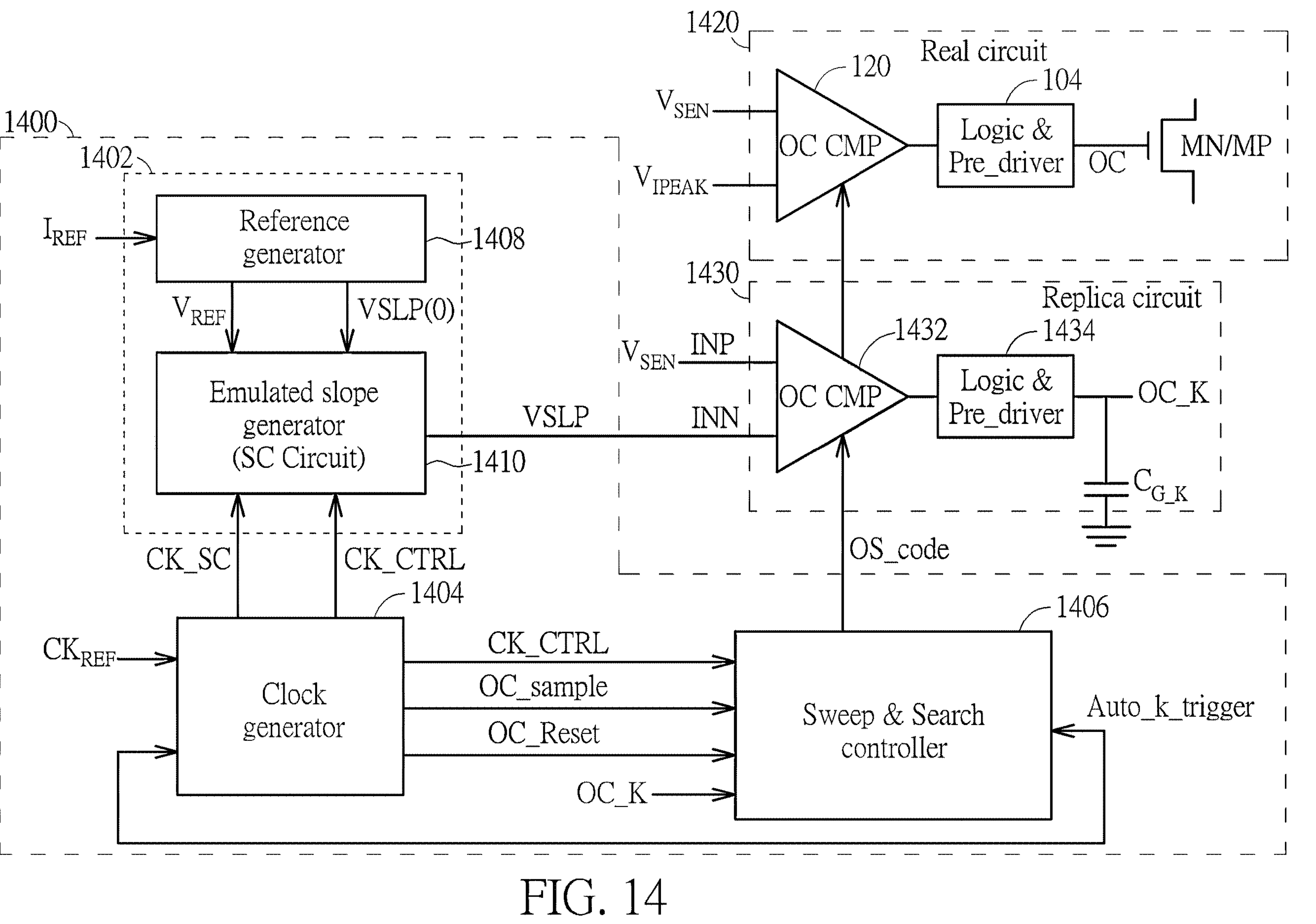
FIG. 14 is a diagram illustrating another calibration circuit used under a background calibration mode according to an embodiment of the present invention.

FIG. 14 is a diagram illustrating another calibration circuit used under a background calibration mode according to an embodiment of the present invention. The PFM converter 100 may further include a replica circuit 1430 that suffers the same power supply and temperature effect as the real circuit 1420, where the real circuit 1420 is involved in regulating the output voltage VOUT of the PFM converter 100 for a load device, and the replica circuit 1430 is used for background calibration only and is not involved in regulating the output voltage VOUT of the PFM converter 100 for a load device. As shown in FIG. 14, the comparator circuit (labeled by "OC CMP") 1432 is a replica of the comparator circuit 120, the PFM control circuit (labeled by "logic & pre_driver") 1434 is a replica of the PFM control circuit 104, the capacitor $C_{G\_K}$ has the estimated capacitance of the power switch circuit (NMOS transistor MN or PMOS transistor MP), and the output signal OC_K has the estimated voltage of the output signal OC.

The calibration circuit 1400 includes a signal generator circuit 1402, a clock generator circuit (labeled by "clock generator") 1404, and a calibration control circuit (labeled by "sweep & search controller") 1406, where the signal generator circuit 1402 includes a reference generator circuit (labeled by "reference generator") 1408 and an emulated slope generator circuit (labeled by "emulated slope generator") 1410. The calibration circuit 124 shown in FIG. 1 may be implemented using the calibration circuit 1400. In this embodiment, the calibration circuit 1400 is used to calibrate the comparator circuit 120 by using the replica circuit 1430 to search for a proper input DC offset VOS, where the input DC offset VOS is calibrated to ensure that a level transition of the output signal OC of the PFM control circuit 104 occurs at or around the expected timing.

The signal generator circuit 1402 is arranged to generate and output an emulated slope signal VSLP to the comparator circuit (replica circuit) 1432 under background calibration mode, where the emulated slope signal VSLP has an emulated slope $$\frac{d(VSLP)}{dt}$$

following an initial voltage VSLP(0), and the emulated slope $$\frac{d(VSLP)}{dt}$$

corresponds to a slope of a sensed signal indicative of electrical characteristic of the inductor L of the PFM converter 100. In this embodiment, the emulated slope $$\frac{d(VSLP)}{dt}$$

corresponds to a slope $$\frac{d(V_{SEN})}{dt}$$

of the voltage $V_{SEN}$ sensed from the inductor current IL of the inductor L. In this embodiment, the signal generator circuit 1402 may employ an SC slope generation circuit (e.g., SC slope generation circuit 900). Hence, the clock generator circuit 1404 further generates and output a control clock CK_SC needed by the SC slope generation circuit. However, this is for illustrative purposes only, and is not meant to be a limitation of the present invention. In another embodiment, the signal generator circuit 1402 may employ an I to V slope generation circuit (e.g., I to V slope generation circuit 800), and generation of the control clock CK_SC may be omitted from the clock generator circuit 1404.

The calibration control circuit 1406 is arranged to refer to an output signal that is generated from the PFM control circuit (replica circuit) 1434 in response to an output signal of the comparator circuit (replica circuit) 1432, to calibrate at least one circuit (real circuit) of the PFM converter 100. In this embodiment, the output signal OC_K of the PFM control circuit (replica circuit) 1434 is received by the calibration control circuit 1406, and the comparator circuit 120 is calibrated by a final control setting OS_code recorded by the calibration control circuit 1406, where the final control setting OS_code is determined through sweeping a plurality of different candidate control settings OS_code of the input DC offset VOS of the comparator circuit 1432.

The operation principle of the calibration circuit 1400 is similar to that of the calibration circuit 1100 shown in FIG. 11. As a person skilled in the art can readily understand details of the calibration circuit 1400 after reading above paragraphs directed to the calibration circuit 1100, similar description of the calibration circuit 1400 is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration circuit of a pulse-frequency modulation (PFM) converter, comprising:

a signal generator circuit, arranged to generate and output an emulated slope signal to a comparator circuit under a calibration mode, wherein the emulated slope signal has an emulated slope following an initial voltage, and the emulated slope corresponds to a slope of a sensed signal indicative of electrical characteristic of an inductor of the PFM converter; and a calibration control circuit, arranged to refer to an output signal that is generated from a PFM control circuit in response to an output signal of the comparator circuit, to calibrate at least one circuit of the PFM converter.

2. The calibration circuit of claim 1, wherein the sensed signal is received by the comparator circuit under a normal mode, and the output signal of the comparator circuit is received by the PFM control circuit under the normal mode.

3. The calibration circuit of claim 2, wherein the at least one circuit comprises the comparator circuit.

4. The calibration circuit of claim 1, wherein the comparator circuit is a replica of another comparator circuit that is arranged to receive the sensed signal, and the PFM control circuit is a replica of another PFM control circuit that is arranged to receive an output signal of the another comparator circuit.

5. The calibration circuit of claim 4, wherein the at least one circuit comprises the another comparator circuit.

6. The calibration circuit of claim 1, further comprising:

a clock generator circuit, arranged to generate and output a control clock to the signal generator circuit and to the calibration control circuit under the calibration mode;

wherein the signal generator circuit periodically resets the emulated slope signal to the initial voltage according to the control clock; and the calibration control circuit sweeps a plurality of different candidate control settings according to the control clock, where the at least one circuit is calibrated by a target control setting selected from the plurality of different candidate control settings.

7. The calibration circuit of claim 6, wherein when the output signal of the PFM control circuit has a level transition under a candidate control setting, the calibration control circuit is further arranged to write the candidate control setting into a storage device as the target control setting and stop the calibration mode.

8. The calibration circuit of claim 1, wherein the sensed signal is indicative of a voltage at one terminal of the inductor.

9. The calibration circuit of claim 8, wherein the initial voltage of the emulated slope signal is a positive voltage, and the emulated slope is a negative slope.

10. The calibration circuit of claim 1, wherein the sensed signal is indicative of an inductor current of the inductor.

11. A calibration method employed by a pulse-frequency modulation (PFM) converter, comprising:

generating and outputting an emulated slope signal to a comparator circuit under a calibration mode, wherein the emulated slope signal has an emulated slope following an initial voltage, and the emulated slope corresponds to a slope of a sensed signal indicative of electrical characteristic of an inductor of the PFM converter; and calibrating at least one circuit of the PFM converter according to an output signal that is generated from a PFM control circuit in response to an output signal of the comparator circuit.

12. The calibration method of claim 11, wherein the sensed signal is received by the comparator circuit under a normal mode, and the output signal of the comparator circuit is received by the PFM control circuit under the normal mode.

13. The calibration method of claim 12, wherein the at least one circuit comprises the comparator circuit.

14. The calibration method of claim 11, wherein the comparator circuit is a replica of another comparator circuit that is arranged to receive the sensed signal, and the PFM control circuit is a replica of another PFM control circuit that is arranged to receive an output signal of the another comparator circuit.

15. The calibration method of claim 14, wherein the at least one circuit comprises the another comparator circuit.

16. The calibration method of claim 11, further comprising:

generating and outputting a control clock;

wherein generating and outputting the emulated slope signal to the comparator circuit under the calibration mode comprises:

periodically resetting the emulated slope signal to the initial voltage according to the control clock;

calibrating the at least one circuit of the PFM converter according to the output signal comprises:

sweeping a plurality of different candidate control settings according to the control clock, wherein the at least one circuit is calibrated by a target control setting selected from the plurality of different candidate control settings.

17. The calibration method of claim 16, wherein calibrating the at least one circuit of the PFM converter according to the output signal further comprises:

in response to the output signal of the PFM control circuit having a level transition under a candidate control setting, writing the candidate control setting into a storage device as the target control setting and stopping the calibration mode.

18. The calibration method of claim 11, wherein the sensed signal is indicative of a voltage at one terminal of the inductor.

19. The calibration method of claim 18, wherein the initial voltage of the emulated slope signal is a positive voltage, and the emulated slope is a negative slope.

20. The calibration method of claim 11, wherein the sensed signal is indicative of an inductor current of the inductor.

* * * * *